United States Patent [19]
Ohakas

[11] 3,864,214
[45] Feb. 4, 1975

[54] APPARATUS FOR THE PLURAL STAGE DISTILLATION OF DRINKING ALCOHOL

[76] Inventor: Evald Ohakas, 1266 Sheridan Ave., Apt. 3F, Bronx, N.Y. 10456

[22] Filed: Nov. 7, 1972

[21] Appl. No.: 304,347

[52] U.S. Cl............................ 202/186, 202/173
[51] Int. Cl............................................. B01d 3/00
[58] Field of Search............ 202/186, 172, 173, 197, 202/198, 199; 203/87

[56] References Cited
UNITED STATES PATENTS

| 3,256 | 9/1843 | Heard | 202/173 |
| 53,062 | 3/1866 | Van Der Weyde | 202/173 |
| 143,654 | 10/1873 | Andersen | 202/173 |
| 469,439 | 12/1892 | Penniman | 202/172 |
| 1,087,907 | 2/1914 | Publicker | 202/172 |
| 1,323,847 | 12/1919 | Dryen | 202/173 |
| 1,484,256 | 2/1924 | Fenton | 202/197 |
| 2,727,000 | 12/1955 | Brewer | 202/173 |

Primary Examiner—Jack Sofer
Assistant Examiner—Frank Sever
Attorney, Agent, or Firm—Kenyon & Kenyon Reilly Carr & Chapin

[57] ABSTRACT

An apparatus and method is disclosed for distilling drinking alcohol from a fermented cereal grain mash. The mash is first heated in a boiler to produce an alcoholic vapor containing oils. The vapor is then cooled sufficiently to cause the heavier oils in the vapor to condense. The vapor is lead through an inclined pipe so that the condensed oils flow backwards down the pipe and through openings in the bottom wall of the pipe, from which the oils are lead to collecting bottles. The alcoholic vapor is lead through another condenser to relieve pressure that has built up in the system and then into a second boiler which is partially filled with water. The vapor is then passed through another condenser and then through another inclined pipe to remove additional oils from the vapor. Finally, the vapor passes through a third stage comprised of a boiler partially filled with water, a condenser and an inclined pipe apparatus similar to the second stage, the vapor is finally condensed, and is collected as a purified alcohol.

5 Claims, 1 Drawing Figure

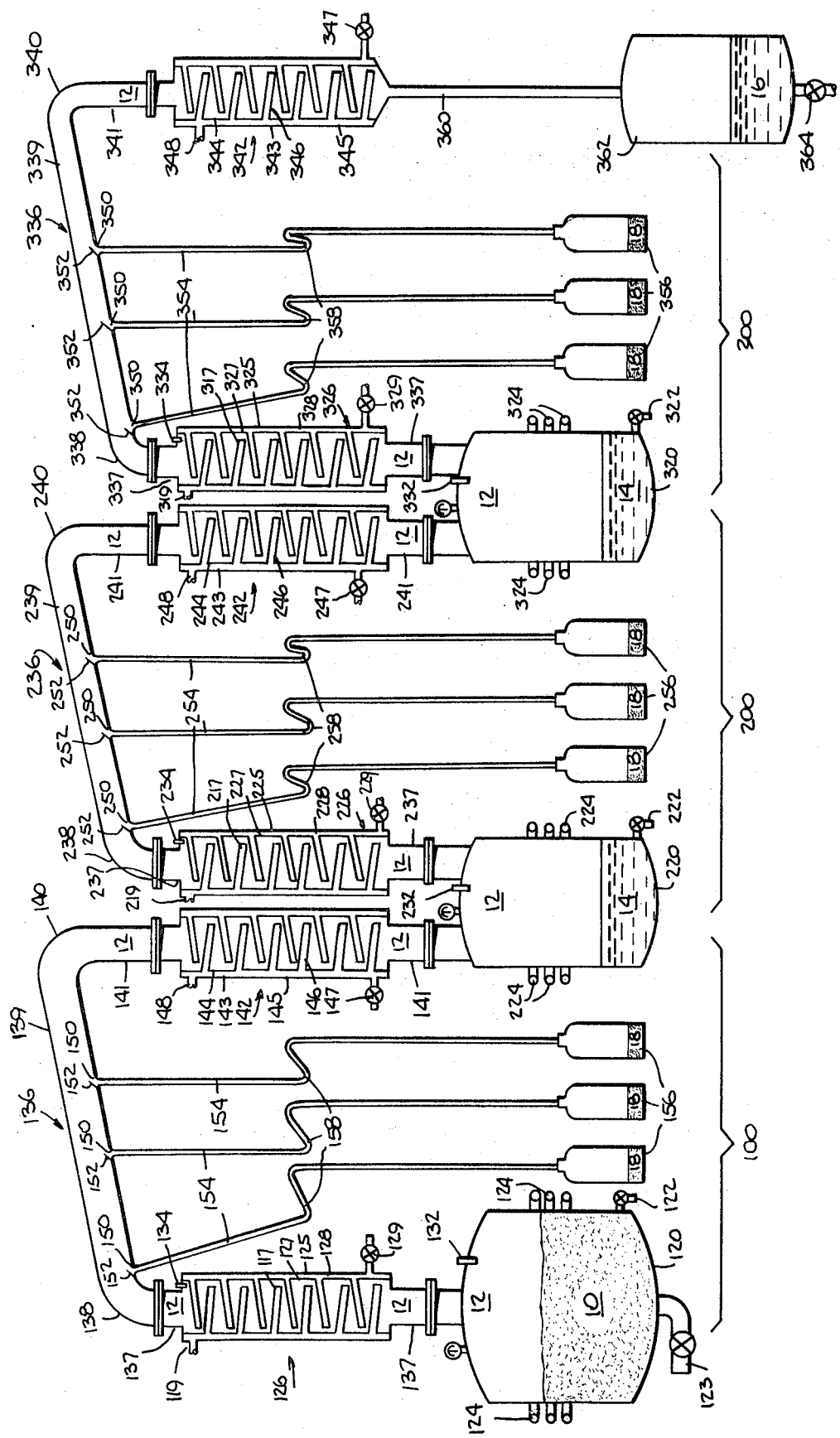

APPARATUS FOR THE PLURAL STAGE DISTILLATION OF DRINKING ALCOHOL

BACKGROUND

This invention relates to an apparatus and method for distilling drinking alcohol from a fermented cereal grain mash by the techniques of alternate vaporization and partial condensation while extracting the oils to produce a relatively pure alcohol without treatment by chemicals.

The preparation of drinking alcohol by known methods and with known apparatus is often accomplished by the use of special equipment such as fractional distillation columns, thereby adding to the expense of the process.

The distillation process is often performed in at least two different steps, the first being the distillation of the fermented mash, and the second being a further purification of the alcohol by removal of the oils which are contained in the final product of the distillation. The second step is often accomplished by means of special filters and chemicals. The heavy oils removed from the alcohol are often in a form which makes them unusable for other purposes without further treatment.

THE INVENTION

It is an object of this invention to provide an apparatus and method for distillation of alcohol which can be carried out quickly, economically and with relatively inexpensive equipment.

It is a further object of this invention to provide an apparatus and process for the distillation of alcohol which does not require chemical treatment to produce a relatively pure drinking alcohol, and which eliminates unpleasant tastes from the alcohol due to the chemicals.

It is another object of this invention to provide a means for extraction, separation and collection of the different oils removed during the distillation process so that the extracted oils are pure enough to be used for other purposes.

It is still another object of this invention to provide a distillation process and apparatus that requires fewer steps for the purification of alcohol.

These and other objects of this invention, which will become apparent from the detailed disclosure and claims to follow, are realized by an apparatus and method comprising a continuous multi-stage treatment of fermented cereal grain mash.

The apparatus is comprised of a plurality of interconnected stages. Each stage is comprised of a boiler, a condenser, a pipe or conduit and means for collecting liquid flowing through openings in the bottom wall of the pipe. The boiler has an inlet and an outlet which discharges alcoholic vapors. The condenser is in heat conducting contact with the vapors from the outlet of the boiler. One end of the pipe communicates with the outlet of the boiler to receive the alcoholic vapors from it, and the other end of the pipe communicates with the inlet of the boiler in the next succeeding stage to discharge the vapors into it. The intermediate section of the pipe is inclined upwardly away from the boiler discharging alcoholic vapors into it, and its bottom wall has at least one opening in it, through which oils condensed from the alcoholic vapor can flow.

The apparatus also comprises a condenser which is in heat conducting contact with the end of the pipe in the last stage, and also means for collecting liquid alcohol discharged from that pipe.

The cross-sectional area of the pipe in each of the stages is greater than the cross-sectional area of the pipe in the next succeeding stage, and when the apparatus is composed of three stages, the ratios of the cross-sectional areas of the pipes in the first, second and third stages may conveniently be approximately 6:5:4.

As an optional feature, the second and all succeeding stages of the apparatus may also comprise a condenser adjacent to the inlet of the boiler in that stage to reduce the pressure of the vapor.

The upward incline of the intermediate section of the pipe in each stage may conveniently be at an angle of approximately 4° with the horizontal.

Also, the boiler in the first stage may be of substantially greater capacity than the boilers in each of the succeeding stages.

Desirably, each of the condensers has a tubular outer wall and a generally corresponding tubular inner wall so as to form an annular space between the inner and outer walls of the condenser. A plurality of downwardly sloping hollow baffles extend partially inwardly from different longitudinal positions along the inner wall of the condenser and communicate with the annular space so that liquid can pass between the annular space and each of the baffles. The baffles alternately extend inward from the inner wall on opposite sides of the condenser and extend substantially more than half-way across the condenser so that a zig-zag shaped passageway bounded by the baffles and the inner wall is formed for the passage of vapors through the condenser. Means are also supplied for controlling the flow of liquid into the annular space and hollow baffles of the condenser.

Preferably, the inside of the bottom wall of the intermediate section of the pipe in each stage has a projection adjacent to the lower side of each opening in the pipe to direct the liquid flowing down that section of the pipe through the corresponding opening. A collecting pipe connects each of the openings to a separate container below the pipe. The first section of the collecting pipe extends downwards from the opening, a second section below the opening extends in an upward direction, and a third and final section once again extends downwards to the container, thereby forming a siphonal, S-shaped section in the connecting pipe. This arrangement helps to assure that only the condensed oils flowing backward down the inclined pipe, and not the alcoholic vapors, pass through the openings, down the collecting pipe and into the containers below.

The openings in the bottom wall of the intermediate section of the pipe in each stage are preferably substantially evenly spaced along the length of that section, and one of the openings is located immediately adjacent the elbow which the intermediate section of each pipe forms with the portion of the pipe which communicates with the outlet of the boiler. The portion of the pipe which communicates with the outlet of the boiler in each stage and the portion of the pipe which communicates with the inlet of the boiler in the next succeeding stage may conveniently extend substantially vertically upward from the outlet of the boiler and downward to the inlet of the next boiler, respectively, thereby forming two elbows with the inclined intermediate section of the pipe.

The method of distilling alcohol according to the invention comprises, first, heating a fermented cereal grain mash sufficiently to produce an alcoholic vapor containing oils. This may be done in the boiler in the first stage of the apparatus of the invention. The vapor is next passed through a condenser and then through an upwardly inclined pipe or conduit having at least one opening in its bottom wall in which the heavier oils in the vapor will condense. The condensed oils are removed from the openings in the bottom wall of the inclined conduit. The alcoholic vapor is next passed over heated water (such as in the boiler in the second stage of the apparatus), into which some of the heavy oils remaining in the vapor will settle, is passed through a second condenser and then through another upwardly inclined conduit, where once again the heavier oils which have condensed in the inclined conduit are removed from the openings in its bottom wall. In a two stage operation, the alcoholic vapor is then condensed to a liquid alcohol.

For further purification, before the alcoholic vapor is condensed to a liquid alcohol, the vapor may be again passed over heated water, through a condenser and through another upwardly inclined conduit with openings in its bottom wall, from which oils are again removed.

The fermented cereal grain mash is heated to a temperature in the range of approximately 85°C to 90°C, the outlet temperature of the condensers is maintained at approximately 69°C, and the heated water over which the vapor is passed is maintained at a temperature in the range of approximately 85°C to 90°C. Conveniently, the heated water fills approximately 25 percent of the boiler into which the alcoholic vapors are discharged.

The alcoholic vapors are maintained under pressure so that they flow through the system. If necessary, the pressure of the alcoholic vapor can be reduced after the condensed oils are removed and before the vapor is passed over the heated water by passing the vapor through another condenser, which can be adjacent to the inlet of the boiler containing the heated water.

Where the inclined conduit has a plurality of openings in its bottom wall, different weights of the condensed oils which are removed can be collected in separate containers.

One type of cereal grain mash that may conveniently be used is a potato, barley mixture in which the potatoes constitute the substantially greater proportion of the mixture be weight.

FIG. 1 is a view, in section, of the distillation apparatus illustrative of the invention, and illustrative of a manner of carrying out the method of the invention.

The apparatus shown in FIG. 1 is comprised of three sections, denoted generally as 100, 200 and 300 for the first, second and third stages of the apparatus, respectively. Each of the three stages has a boiler 120, 220 and 320 surrounded by coils 124, 224 and 324, respectively, through which steam can be circulated to heat the contents of the boiler. At the bottom of the boilers are valves 122, 222 and 322, boiler 120 also having a drain 123. The top of the boilers are provided with thermometers 132, 232 and 332 to sense the temperature during heating. The boiler 120 in the first stage may be of substantially greater capacity than the boilers 220 and 320 in the second and third stages.

Each of the three stages has a pipe or conduit denoted generally as 136, 236 and 336, respectively, and each pipe is composed of three sections. The first sections 137, 237 and 337 extend vertically upward from the outlets at the tops of the boilers 120, 220 and 320, respectively. The intermediate sections 139, 239 and 339 of the pipes begin at elbows 138, 238 and 338, and are in turn connected at elbows 140, 240 and 340 to the third sections 141, 241 and 341, of the pipes. Third pipe sections 141 and 241 extend substantially vertically downward into the inlets at the tops of the boilers in the next succeeding stages. Thus, pipe section 141 of pipe 136 extends downwards into the top inlet of boiler 220. Likewise, section 241 of pipe 236 extends downwards into the top inlet of boiler 320.

The intermediate pipe sections 139, 239 and 339 are inclined upwards between elbows 138, 238 and 338 and elbows 140, 240 and 340, respectively, to form an angle with the horizontal which may conveniently be approximately 4°. Pipe sections 139, 239 and 339 are of approximately the same length, but the pipes 136, 236 and 336 are of decreasing cross-sectional area so that the cross-sectional area of pipe 136 is greater than the cross-sectional area of pipe 236, and the cross-sectional area of pipe 236 is greater than the cross-sectional area of pipe 336. The ratios of the cross-sectional areas of pipes 136 to pipe 236 to pipe 336 may conveniently be approximately 6:5:4.

Sections 137, 237 and 337 of pipes 136, 236 and 336 are surrounded by condensers 126, 226 and 326, respectively. Each of the condensers has a tubular outer wall 125, 225 and 325, and a generally corresponding tubular inner wall 127, 227 and 327, respectively, to form an annular space 128, 228 and 328 between the outer and inner walls of each of the condensers. From different places along the length of each of the condensers a plurality of hollow baffles 117, 217 and 317 extend partially inwardly from the inner walls 127, 227 and 327, respectively. Each of the hollow baffles communicates with the annular space surrounding the condensers so that liquid can pass between the annular space and the interior of the hollow baffles. The baffles 117, 217 and 317 alternately extend inward from the inner wall on opposite sides of the condenser, and extend substantially more than half-way across the condenser so as to leave a relatively narrow passageway between the end of each baffle 117, 217 and 317 and the inner wall 127, 227 and 327 on the opposite side of the condenser.

There is thus formed in the interior of each of the condensers 126, 226 and 326 a zig-zag shaped passageway longitudinally through the condenser and bounded by the baffles and the inner walls of the condenser. Alcoholic vapors may pass through the condensers along the zig-zag path.

Cold water or other fluid can be used to fill the annular space 128, 228 and 328 and the interior of the baffles 117, 217 and 317, respectively, of each of the condensers 126, 226 and 326 through inlet valves 129, 229 and 329 at the bottom of the condensers, and the liquid can flow out of the top of the condensers at outlets 119, 219 and 319, respectively.

Pipe sections 141, 241 and 341 are surrounded by condensers 142, 242 and 342, respectively, which are constructed in a manner similar to the construction of condensers 126, 226 and 326. Thus, each of the condensers has a tubular outer wall 143, 243 and 343 and a generally corresponding tubular inner wall 144, 244 and 344, respectively, to form an annular space 145, 245 and 345 between the outer and inner walls of each of the condensers. From different places along the length of each of the condensers a plurality of hollow baffles 146, 246 and 346 extend partially inwardly from the inner walls and communicate with the annular space surrounding the condenser so that liquid can pass between the annular space and the interior of the hollow baffles. The baffles 146, 246 and 346 alternately extend inward from the inner wall on opposite sides of each of the condensers, and extend substantially more than half-way across the condenser so as to form in the interior of each of the condensers 142, 242 and 342 a zig-zag shaped passageway longitudinally through the condenser and bounded by the baffles and the inner walls of the condenser through which alcoholic vapors may pass.

Cold water or other fluid can be used to fill the annular space 145, 245 and 345 and the interior of the baffles 146, 246 and 346 of each of the condensers through inlet valves 147, 247 and 347, respectively, at the bottom of the condensers, and can flow out of the top of the condensers at outlets 148, 248 and 348, respectively.

Condensers 142 and 242 are optional and may be used if necessasry to reduce the pressure of vapors passing through the pipes.

Multiple openings 150, 250 and 350 are provided in the bottom walls of pipe sections 139, 239 and 339, respectively. One of the openings 150, 250 and 350 is located just after the elbows 138, 238 and 338. The other openings are substantially evenly spaced throughout the length of pipe sections 139, 239 and 339. For example, there may conveniently be a total of three such openings in the bottom of each of the intermediate pipe sections. Next to each opening are provided projections 152, 252 and 352 attached to the bottom wall of the pipe sections 139, 239 and 339, at the lower side of each opening and extending inwardly, partially into the pipe. There projections may be provided by material from the bottom of the pipe which is displaced when the openings 150, 250 and 350 are formed.

Extending downwards from each of the openings 150, 250 and 350 are collecting pipes 154, 254 and 354, respectively. These pipes lead into containers 156, 256 and 356, respectively. The first section of each of the collecting pipes extends downwards towards the containers below, a second section 158, 258 and 358 of each collecting pipe extends in an upward direction, and the last section once again extends downward to the containers, so that there is formed in each collecting pipe an intermediate, siphonal, S-shaped section.

Connected to the outlet of condenser 342 at the end of the third stage 300 of the apparatus, is a pipe 360 which leads to a container 362, having a drain 364.

In the operation of the distillation apparatus shown in FIG. 1, by the method of the invention, a fermented cereal grain mash 10, such as a fermented potato, barley mixture, is placed in the boiler 120. The type of grain that is used and the proportions of the ingredients in the mash will be determined in part by the desirable taste of the alcohol being produced, and is within the skill of those in the art. A potato, barley mash containing approximately 89 percent potatoes and 11 percent barley by weight is one appropriate mixture.

The fermented mash 10 is heated by passing steam through the coils 124 surrounding the boiler 120. A temperature of between approximately 85°C and 90°C is maintained on thermometer 132. That temperature will be sufficient to produce an alcoholic vapor 12 containing oils, which will pass upwards out of the boiler and through pipe section 137 of pipe 136, and through the condenser 126. Cold water or other liquid may be used to fill the annular space 128 and the baffles 117 of the condenser 126 to provide a relatively large surface area of the condenser in heat conducting contact with the alcoholic vapors which pass upward through the condenser 126 along the zig-zag path bounded by the inner wall 127 and the baffles 117 of the condenser. Each of the baffles 117 is sloped downwardly so that condensation will not be trapped in the interior of the condenser. The temperature around thermometer 134 at the top of the condenser 126 is maintained at approximately 69°C by controlling the circulation of the fluid in the condenser by means of the inlet valve 129 at the bottom of the condenser. The cold liquid flows out of the condenser at the outlet 119 at the top of the condenser.

As alcoholic vapor 12 passes out of the condenser 126 and the pipe section 137 and past elbow 138 into pipe section 139, the heavier oils 18 in the vapor 12 partially condense to form liquid oil droplets on the bottom of pipe section 139.

Because of the upward incline of pipe section 139, the oil 18 will flow down the pipe section until it reaches the nearest opening 150 in the bottom wall of the section. The oil will be prevented from flowing past the openings and will be directed into the openings by the projections 152. The placement of one of the openings 150 and projections 152 adjacent the elbow 138 in the pipe 136 helps to prevent oils from flowing down through pipe section 137 back into the boiler 120. Even spacing of the openings 150 along pipe section 139 facilitates the flow of different weight oils through the different openings 150, and down different pipes 154, so that they will be collected in different containers 156. The oils 18 collected in the containers 156 may find use in other applications.

The pipes 154 are provided with upwardly extending intermediate sections 158 so that part of the S-shaped section formed thereby will become filled with oil and will help to prevent the pressurized vapor 12 contained in pipe section 139 from passing downwards into the containers 156, while permitted the condensed oils 18 to do so.

The pressure of the vapor 12 in pipe section 139 will cause the vapor to move past elbow 140 into pipe section 141, where the pressure may be reduced, if necessary, by circulating cold water or other fluid in the annular space 145 and the interior of the baffles 146 of the condenser 142 by means of the inlet valve 147 and outlet 148.

The partially purified alcoholic vapor 12 passes from pipe section 141 into the second stage of the distillation apparatus and process by discharging into the inlet at the top of the boiler 220. Boiler 220 is partially filled with water 14, conveniently to a height of approximately 25 percent, and is heated by passing steam through coils 224 so that the temperature at thermometer 232 is maintained at approximately 85°C. While passing over the heated water 14 in the boiler 220, a portion of the heavier oils contained in the vapor entering the boiler settles in the water at the bottom.

The alcoholic vapor 12 then passes upward out of the outlet of the boiler 220, through pipe section 237 of pipe 236, and through condenser 226, wherein cold water or other liquid is contained in the annular space 228 and the interior of the baffles 217 and may be circulated through inlet valve 229 and out of outlet 219. The temperature at thermometer 234 is maintained at approximately 69°C. As the alcoholic vapor 12 passes through the condenser 226 and past the elbow 238 into section 239 of pipe 236, some of the heavier oils condense on the bottom wall of pipe section 239 and flow downward along the pipe and through openings 250 into pipes 254 and containers 256.

The still further purified vapor 12 next passes down through pipe section 241 and through condenser 242, through which cold fluid may be circulated, to again relieve the pressure of the vapor 12, if necessary.

The vapor 12 passes out of pipe section 241, discharging into the inlet at the top of the boiler 320 in the third stage of the apparatus. Boiler 320 is partially (conveniently about 25 percent), filled with water 14 which is heated by passing steam through the coils 324 surrounding the boiler to maintain a temperature at thermometer 332 of approximately 85°C. Additional oils are removed from the vapor and settle in and become mixed with the water 14 in the boiler as the vapor passes above the water in boiler 320.

The further purified vapor passes upwards out of the outlet of boiler 320 into pipe section 337 and through condenser 326, through which cold water or other fluid is circulated, so that the temperature at thermometer 334 is kept at approximately 69°C. Further oils are removed from the vapor in pipe section 339 of pipe 336, as the oils condense and flow downward along the bottom wall of the pipe section and through the openings 350, down the pipes 354, and into the containers 356.

The purified alcoholic vapor passes through pipe section 339, past elbow 340, into pipe section 341 and then through condenser 342. Cold fluid is circulated through the annular space 345 and the baffles 346 of the condenser 342 so as to condense the alcoholic vapor 12 into liquid alcohol 16 which then flows down pipe 360 into collecting barrel 362.

After a batch of the mash in the boiler 120 has been depleted, the purified alcohol 16 collected in the barrel 362 can be removed for use through drain 364, and the different weight oils 18 collected in the containers 156, 265 and 356 can be removed for use in other applications. Boiler 120 may then be cleaned and drained by means of valve 122 and drain 123 and boilers 220 and 320 drained and fresh water added through valves 222 and 322, respectively. A new batch of cereal grain mash 10 may then be placed in boiler 120, and the process can be repeated.

To illustrate the operation of the invention, a fermented potato, barley mash approximately 89 percent potatoes and 11 percent barley by weight may be heated in boiler 120. Boiler 120 can conveniently be of 150 gallon capacity, while boilers 220 and 320 are each of 60 gallon capacity and filled approximately 25 percent with water. The diameter of pipe 136 can be 12 inches, with the diameter of pipe 236 being 10 inches and of pipe 336, 8 inches. Pipe sections 139, 239 and 339 can each be approximately 24 feet in length, and be inclined upward from the horizontal at an angle of about 4°. The bottom wall of each of these sections may be provided with three openings. When the apparatus is operated as described hereinabove under these conditions, the yield is estimated to be approximately 25 gallons per hour of alcohol of an estimated purity of about 92 percent.

It should be evident from the foregoing discussion that an apparatus and method in accordance with this invention can be practiced with fewer or greater than three stages. If only two stages are used, the resulting alcohol will not be as pure as when the three stage apparatus and method as shown in FIG. 1 is employed. The utilization of additional stages, though not ordinarily necessary to produce alcohol sufficient for consumption, will further purify the alcoholic end product.

In addition, it is to be understood that, while this specific embodiment of the invention has been shown and described in detail to illlustrate the application of the principles of the invention, the invention may be embodied in other ways without departing from these principals in light of the teachings herein.

What is claimed is:

1. An apparatus for distillation of drinking alcohol, comprising:
  a plurality of interconnected stages, each stage comprising:
   a boiler having an inlet and an outlet which discharges alcoholic vapors,
   an outlet condenser in heat conducting contact with the vapors from the outlet of said boiler,
   an inclined pipe having a first end and a second end, said first end communicating with said outlet condenser to receive vapors which have passed from the outlet of said boiler through said outlet condenser, and said second end of the inclined pipe communicating with the inlet of the boiler in the next one of said stages to discharge vapors thereinto, said inclined pipe having an intermediate section between said ends upwardly inclined away from said boiler, and the bottom wall of said intermediate section of said inclined pipe having at least one opening therein, and
   means for collecting liquid flowing through said opening;
  a collection condenser in heat conducting contact with the second end of the inclined pipe in the last of said stages; and
  means for collecting liquid from said collection condenser;
 wherein the outlet condenser in at least one of said stages is comprised of a tubular outer wall, a tubular inner wall corresponding generally to said outer wall to form an annular space between said inner and outer walls, a plurality of downwardly sloping hollow baffles extending partially inwardly from different longitudinal positions along said inner wall and communicating with said annular space for the passage of liquid therebetween, alternate ones of said baffles extending inwardly from the inner wall on opposite sides of the condenser, said baffles extending substantially more than half way to the inner wall on the opposite side of said condenser so as to form a zig-zag shaped passageway bounded by said baffles and said inner wall for the passage of vapors through said outlet condenser, and means for controlling the flow of liquid into said annular space and said baffles.

2. An apparatus for distillation of drinking alcohol, comprising:
a plurality of interconnected stages, each stage comprising:
a boiler having an inlet and an outlet which discharges alcoholic vapors,
an outlet condenser in heat conducting contact with the vapors from the outlet of said boiler,
an inclined pipe having a first end and a second end, said first end communicating with said outlet condenser to receive vapors which have passed from the outlet of said boiler through said outlet condenser, and said second end of the inclined pipe communicating with the inlet of the boiler in the next one of said stages to discharge vapors thereinto, said inclined pipe having an intermediate section between said ends upwardly inclined away from said boiler, and the bottom wall of said intermediate section of said inclined pipe having at least one opening therein, and
means for collecting liquid flowing through said opening;
a collection condenser in heat conducting contact with the second end of the inclined pipe in the last of said stages; and
means for collecting liquid from said collection condenser;
wherein the outlet condenser in at least one of said stages is comprised of a pluality of downwardly sloping hollow baffles extending within said outlet condenser from different longitudinal positions along the outlet condenser and communicating at alternate sides of said outlet condenser so as to define a zig-zag shaped passageway for the passage of vapors through said outlet condenser and a separate path therebetween for the passage of cooling liquid through said condenser, and means for controlling the flow of cooling liquid therethrough.

3. An apparatus for distillation of drinking alcohol, comprising:
a plurality of interconnected stages, each stage comprising:
a boiler having an inlet and an outlet which discharges alcholic vapors,
an outlet condenser in heat conducting contact with the vapors from the outlet of said boiler,
an inclined pipe having a first end and a second end, said first end communicating with said outlet condenser to receive vapors which have passed from the outlet of said boiler through said outlet condenser, and said second end of the inclined pipe communicating with the inlet of the boiler in the next one of said stages to discharge vapors thereinto, said inclined pipe having an intermediate section between said ends upwardly inclined away from said boiler, and the bottom wall of said intermediate section of said inclined pipe having at least one opening therein, and
means for collecting liquid flowing through said opening;
a collection condenser in heat conducting contact with the second end of the inclined pipe in the last of said stages; and
means for collecting liquid from said collection condenser;
wherein said means for collecting liquid flowing through the opening in the bottom wall of the inclined pipe comprises a container below said inclined pipe and a collecting pipe between said opening and said container having a first section extending downward from said opening, a second section below said opening extending in an upward direction, and a third section extending downward to said container, and wherein each of said stages further comprises temperature sensing means adjacent the outlet of said boiler to sense the temperature of the vapors discharged therefrom; wherein the bottom of said intermediate section of said inclined pipe has a plurality of openings substantially evenly spaced along the length of said section, and wherein said means for collecting liquid comprises an equal plurality of said containers and said collecting pipes; wherein said inclined pipe extends substantially vertically upward from the outlet of said boiler and substantially vertically downward to the inlet of the boiler in the next of said stages, forming two elbows with said inclined intermediate section of said inclined pipe; wherein one of said openings is located immediately adjacent the elbow between said intermediate section of said inclined pipe and the portion of said pipe extending upward from the outlet of said boiler; and wherein the outlet condenser in each of said stages is comprised of a tubular outer wall, a tubular inner wall corresponding generally to said outer wall to form an annular space between said inner and outer walls, a plurality of downwardly sloping hollow baffles extending partially inwardly from different longitudinal positions along said inner wall and communicating with said annular space for the passage of liquid therebetween, alternate ones of said baffles extending inwardly from the iner wall on opposite sides of the condenser, said baffles extending substantially more than half-way to the inner wall on the opposite side of said outlet condenser so as to form a zig-zag shaped passageway bounded by said baffles and said inner wall for the passage of vapors through said condenser, and means for controlling the flow of liquid into said annular space and said baffles.

4. An apparatus as in claim 3 wherein there are three of said stages, wherein in each of said stages the inside of the bottom wall of said intermediate section of said inclined pipe has a plurality of projections equal to the number of said openings in said section, each of said projections being adjacent to the lower side of a different one of said openings to direct liquid flowing down said section through said opening, wherein the inclined pipes in the first, second and third stages are respectively of decreasing cross-sectional areas, wherein the second and third stages each further comprise an inlet condenser adjacent the inlet of the boiler, wherein the capacity of the boiler in the first stage is substantially greater than the capacity of the boilers in the second and third stages, and wherein the intermediate section of the inclined pipe in each of said stages is inclined upward at a small acute angle with the horizontal.

5. An apparatus for distillation of drinking alcohol, comprising:
a plurality of interconnected stages, each stage comprising:
a boiler having an inlet and an outlet which discharges alcoholic vapors,
an outlet condenser in heat conducting contact with the vapors from the outlet of said boiler,
an inclined pipe having a first end and a second end, said first end communicating with said outlet condenser to receive vapors which have passed from the outlet of said boiler through said outlet condenser, and said second end of the inclined pipe communicating with the inlet of the boiler in the next one of said stages to discharge vapors thereinto, said inclined pipe having an intermediate section between said ends upwardly inclined away from said boiler, and the bottom wall of said intermediate section of said inclined pipe having at least one opening therein, and means for collecting liquid flowing through said opening;

a collection condenser in heat conducting contact with the second end of the inclined pipe in the last of said stages; and means for collecting liquid from said collection condenser;

wherein said means for collecting liquid flowing through the opening in the bottom wall of the inclined pipe comprises a container below said inclined pipe and a collecting pipe between said opening and said container having a first section extending downward from said opening, a second section below said opening extending in an upward direction, and a third section extending downward to said container, and wherein each of said stages further comprises temperature sensing means adjacent the outlet of said boiler to sense the temperature of the vapors discharged therefrom; wherein the bottom of said intermediate section of said inclined pipe has a plurality of openings substantially evenly spaced along the length of said section, and wherein said means for collecting liquid comprises an equal plurality of said containers and said collecting pipes; wherein said inclined pipe extends substantially vertically upward from the outlet of said boiler and substantially vertically downward to the inlet of the boiler in the next of said stages, forming two elbows with said inclined intermediate section of said inclined pipe; wherein one of said openings is located immediately adjacent the elbow between said intermediate section of said inclined pipe and the portion of said pipe extending upward from the outlet of said boiler; and wherein the outlet condenser in each of said stages is comprised of a plurality of downwardly sloping hollow baffles extending within said outlet condenser from different longitudinal positions along the outlet condenser and communicating at alternate sides of said outlet condenser so as to define a zig-zag shaped passageway for the passage of vapors through said outlet condenser and a separate path therebetween for the passage of cooling liquid through said outlet condenser, and means for controlling the flow of cooling liquid therethrough.

* * * * *